United States Patent [19]

Vicari et al.

[11] Patent Number: 5,274,069
[45] Date of Patent: Dec. 28, 1993

[54] PROCESS FOR PREPARING IMPROVED POLYARYLATES

[75] Inventors: Richard Vicari; Mark A. Murphy, both of Corpus Christi, both of Tex.

[73] Assignee: Hoechst Celanese Corporation, Sommerville, N.J.

[21] Appl. No.: 954,538

[22] Filed: Sep. 29, 1992

[51] Int. Cl.$^5$ .................... G08G 63/00; G08G 63/02
[52] U.S. Cl. .................... 528/193; 528/176; 528/190; 528/194
[58] Field of Search ............. 528/176, 193, 190, 194

[56] References Cited

U.S. PATENT DOCUMENTS

| | | |
|---|---|---|
| 3,669,927 | 6/1972 | Terasaki et al. ............ 528/195 |
| 3,948,856 | 4/1976 | Stackman . |
| 4,294,956 | 10/1981 | Berger et al. . |
| 4,374,239 | 2/1983 | Berger et al. . |
| 4,394,496 | 7/1983 | Schrader . |
| 4,533,720 | 8/1985 | Yu . |
| 4,612,360 | 9/1986 | Ort . |
| 4,764,580 | 8/1988 | Martin et al. . |
| 5,004,796 | 4/1991 | Vicari et al. . |

OTHER PUBLICATIONS

Robert W. Stackman, "Preparation of Aromatic Polyesters of Hindered Phenols by Acid Interchange Polycondensation. 1. Solvent Effects", Ind. Eng. Chem. Prod. Res. Dev., 1981, 20 336–338.

Primary Examiner—John Kight, II
Assistant Examiner—T. Mosley
Attorney, Agent, or Firm—James J. Mullen; Donald R. Cassady; Michael W. Ferrell

[57] ABSTRACT

A polyarylate is formed by reacting a mixture of esters of a dihydric phenol and trisphenol, at least one aromatic dicarboxylic acid, an alkali metal catalyst, an inert diluent having a boiling point of from about 200° C. to about 300° C. Polyarylates of improved shear sensitivity and higher molecular weight can be formed.

17 Claims, 2 Drawing Sheets

PROCESS FOR PREPARING IMPROVED POLYARYLATES

BACKGROUND OF THE INVENTION

This invention is directed to a process for producing polyarylates having improved shear sensitivity and higher molecular weight.

Polyarylates are polyesters derived from a dihydric phenol, particularly 2,2-bis(4-hydroxyphenyl)propane, also identified as bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have fairly good processability which allows them to be molded into a variety of articles.

Many processes have been described in the literature for the preparation of polyarylates. One such process is the diacetate process. In the diacetate process, a dihydric phenol is converted to its diacetate, which is then reacted with an aromatic dicarboxylic acid(s) to form the polyarylate.

However, the polyarylates produced by the diacetate process have a tendency to be colored which could make them unsuitable in some end use applications. Thus, there is a desire to improve the color of the polyarylate for such end use applications.

In addition, there are other problems in the diacetate process for producing polyarylates which must be economically and practically solved in order to have a viable, economically attractive process. One problem occurs when the reaction takes place in the molten state. In such molten reaction, sublimation of the diacid occurs. This disrupts the stoichiometry of the reaction and the polyarylate produced is not of acceptable molecular weight. Another problem when a diester derivative of a dihydric phenol is reacted with an aromatic dicarboxylic acid in the molten state is that the viscosity of the system increases dramatically towards the end of the reaction and therefore the reaction becomes diffusion controlled (the molecules are not close enough to insure rapid reaction) rather than kinetically controlled. Also, the polymer product is difficult to handle (i.e., removal from the reactor) due to this high melt viscosity.

Yet another problem in the production of polyarylates by the diacetate process is that a carboxylic acid is a by-product of the reaction. In order to provide an efficient, economical process and a high molecular weight polyarylate, the acid, for example, the acetic acid, has to be conveniently and efficiently removed.

U.S. Pat. No. 4,294,956 discloses that the reaction of the diester derivative of a dihydric phenol with the aromatic dicarboxylic acid can be carried out in a diphenyl ether solvent which is present in amounts of from about 10 to about 60, based on the weight of the polyarylate produced. The diphenyl ether compound may be substituted. These substituents are selected from alkyl groups, chlorine, bromine, or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol. A preferred solvent comprises a eutectic mixture of diphenyl oxide and biphenyl, which solvent is a liquid at room temperature which is marketed under the name Dowtherm A from Dow Chemical Corporation.

The utilization of from about 10 to about 60 percent of a diphenyl ether compound in the diacetate process reduces sublimation of the aromatic dicarboxylic acid; thus producing polyarylates of acceptable molecular weight. Also, the diphenyl ether compound provides for better removal of the acetic acid by-product. Further, an additional benefit is that the viscosity of the system is decreased. This decrease in viscosity provides a faster reaction time since better mixing of the reactants occurs which allows the reaction to proceed under kinetic control. Additionally, reaction times are relatively short so that a polyarylate is produced generally in less than 10 hours at the reaction temperatures and the polyarylates produced possess lighter color, as compared to those utilizing longer reaction times.

While the formation of polyarylates by the diacetate process has worked sufficiently well utilizing a diphenyl ether diluent such as disclosed in U.S. Pat. No. 4,294,956, there still remains the problem of separating the diphenyl ether from the acetic acid by-product. Thus, the diphenyl ether and acetic acid form a solution necessitating additional process steps to recover the diluent for return to the polymerization process. Moreover, polyarylate color still remains a problem even when using the diluent in polymer formation.

Other diluents or solvents have been suggested for producing polyarylates by the diacetate process. For example, U.S. Pat. No. 4,374,239 discloses polymerizing the diester of a dihydric phenol with an aromatic dicarboxylic acid in the presence of at least one halogenated and/or etherated substituted aromatic or heteroaromatic compound. Examples include 1,3,4-trichlorobenzene, 1,4-dimethoxy benzene and o-dichlorobenzene. Many other examples are cited in the patent disclosure.

U.S. Pat. No. 4,533,720 discloses forming polyarylates by the diacetate process utilizing a gammabutyrolacetone as a diluent. The patent discloses that this diluent reduces sublimation of reactants resulting in higher molecular weight polymers.

U.S. Pat. No. 5,004,796 discloses that the use of a diluent for preparing polyarylates by the diacetate process which will have the advantages of the prior art in reducing sublimation of the monomeric components and thus produce polyarylates of acceptable molecular weight and color and to reduce the viscosity of the polymerization system. This diluent will facilitate better removal of the acetic acid by-product and at the same time be easily separated from the acetic acid by-product for recycling.

There still remains the problem in the polyarylate art (disclosed above) of the formation of linear polyesters characterized by having low shear sensitivity and which pose problems in the end use application of molding, extrusion, and blow molding. Thus, there is a need to provide polyarylates being branched instead of linear and having a significantly increased shear sensitivity.

OBJECTS OF THE INVENTION

The primary object of the present invention is to provide polyarylates having utility as a relatively inexpensive, solid molding or casting material which have a higher shear sensitivity.

A further object is to provide branched polyarylates which at low shear have higher melt viscosity than their linear counterparts, and at higher shear, have lower melt viscosities compared to their linear counterparts which basically stay the same between low shear and high shear process conditions.

Still, other objects will be made apparent to those knowledgeable in the art by the following specifications and claims.

SUMMARY OF THE INVENTION

The present invention is directed to an improved polymerization process for preparing high shear sensitivity, high molecular weight aromatic polyesters. The process comprises reacting a diester of a dihydric phenol, or an acid anhydride and a dihydric phenol with an aromatic dicarboxylic acid, or a mixture of aromatic dicarboxylic acids in the presence of (1) an inert diluent ether compound or having a boiling point of about 200° C. to about 300° C. such as a diphenyl ether compound or a poly (fluorinated alkylene oxide) having the repeating unit:

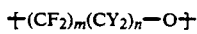

wherein m is an integer from 1 to 10, n is an integer from 0 to 5, Y is the same or different and represents hydrogen or halogen; and (2) suitable amounts of a trisphenol whose formula is:

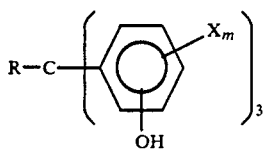

wherein R is H or a branched or linear, $C_1$ to $C_{10}$ alkyl or alkenyl radical, m is 0, 1, or 2; X is any non-interfering substituent, the same or different in each occurrence, and the position of the —OH on the ring may be the same or different in each occurrence; and (3) a reaction catalyst such as an alkali metal hydroxide (e.g. lithium hydroxide), cobalt salts (e.g. cobalt acetate), and mixtures thereof.

DESCRIPTION OF THE INVENTION

Figure 1:
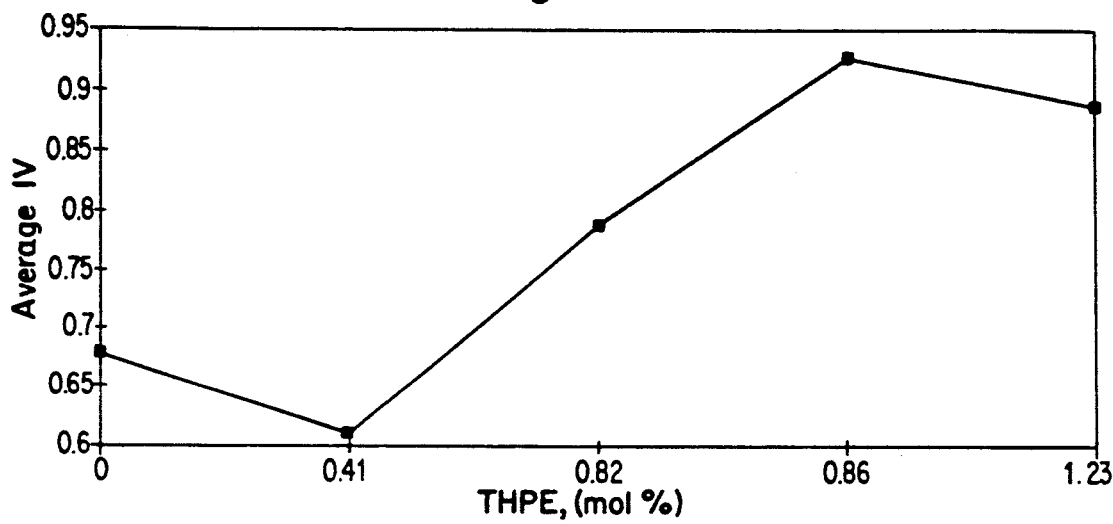
FIGS. 1 and 3 show the effect of a trisphenol on the intrinsic viscosity in melt polymerization and solution polymerization process, respectively, and are representative of the data obtained from the experiments described herein.

The present invention is directed, in general, to an unproved process for the preparation of normally solid amorphous polyarylates which process comprises reacting a diester derivative of a dihydric phenol with an aromatic dicarboxylic acid or a mixture of aromatic dicarboxylic acids in the presence of an inert diluent, a reaction catalyst, and a trisphenol.

The present process comprises reacting:

(a) at least one diester derivative of a dihydric phenol having the following formula:

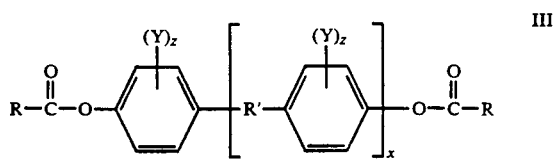

wherein R is independently selected from hydrogen, an alkyl radical having from 1 to about 6 carbon atoms, preferably methyl, cycloalkyl having from 4 to about 7 carbon atoms, or aryl, Y is independently selected from alkyl groups of 1 to 4 carbon atoms, chlorine or bromine, z independently has a value of from 0 to 4, inclusive, and R' is independently selected from a divalent saturated aliphatic hydrocarbon radical, particularly alkylene or alkylidene radicals having from 1 to 8 carbon atoms or halogenated derivatives thereof, especially $C(CH_3)_2$, $C(CX_3)_2$; wherein X is a halogen, preferably fluorine, cycloalkylene or cycloalkylidene radicals having up to and including 9 carbon atoms, halogenated derivatives thereof, O, S, SO, $SO_2$, and CO, x is 0 or 1; and (b) at least one aromatic dicarboxylic acid in the presence of an inert diluent, a reaction catalyst and a trisphenol.

The diester derivative of the dihydric phenol is prepared by reacting a dihydric phenol with an acid anhydride derived from acids containing from 1 to 8 carbon atoms under conventional esterification conditions. The preferred acid anhydride is acetic anhydride. Although the diester derivative of the dihydric phenol can be formed prior to reaction with the aromatic dicarboxylic acid, it is preferred to perform the reaction in one vessel in which the aromatic dicarboxylic acid, dihydric phenol, and acid anhydride are added simultaneously. Thus, the reaction can be represented below using as reactants terephthalic acid, bisphenol-A, and acetic anhydride.

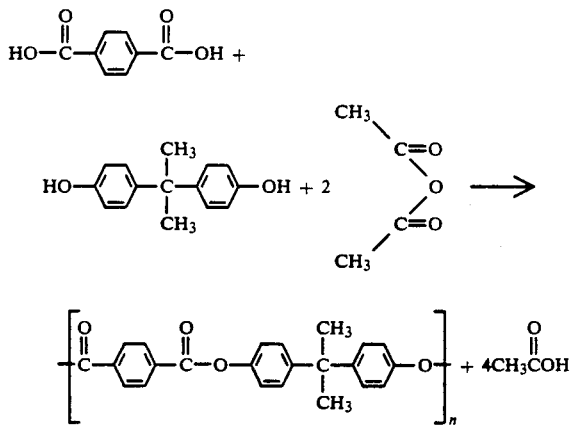

The dihydric phenols that may be used in this invention include but are not limited to the following:
2,2-bis-(4-hydroxyphenyl)propane,
2,2-bis-(4-hydroxyphenyl)hexafluoropropane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane, 1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

These dihydric phenols may be used individually or in any combination. It is also possible to add up to 50 wt. % based on the total diol content of aliphatic diols, such as neopentyl glycol. The preferred dihydric phenol is 2,2-bis(4-hydroxyphenyl)propane (bisphenol-A).

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used such as in a ratio ranging from 85:15 to 15:85. More preferably, the isophthalic acid to terephthalic acid ratio in the mixture is about 80:20 to 50:50. An especially preferred mixture comprises 75:25 isophthalic acid to terephthalic acid. Also, from about 0.5 to about 20 percent of aliphatic diacids containing from 2 to about 10 carbon atoms, such as adipic acid, sebacic acid, and the like may be additionally used in the polymerization reaction.

The reaction of the diester derivative of a dihydric phenol with the aromatic carboxylic acid is carried out in the presence of an inert diluent which has a boiling point of from about 200° C. to about 350° C., preferably from about 220° C. to about 300° C.

Suitable diluents which assist in achieving the objects of the present invention include, without limitation, diphenyl ether, halogenated diphenyl ether, diphenyl sulfone, benzophenone, polyphenyl ethers such as tri and tetraphenyl ether, terphenyl, tetraphenyl, halogenated biphenyl, and the like.

These and other suitable diluents are disclosed in U.S. Pat. No. 3,948,856 and Ing. Eng. Chem. Prod. Res. Dev., Vol. 20, No. 2, 1981; both of these are incorporated herein by reference.

Other suitable diluents include a poly (fluorinated alkylene oxide) having repeating units as follows:

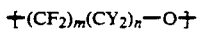

$$+(CF_2)_m(CY_2)_n-O+ \quad\quad I$$

wherein m is an integer from 1 to 10, n is an integer from 0 to 5, Y is the same or different and represents hydrogen or halogen including F, Cl or Br. The poly(fluorinated alkylene oxide) can be either a straight or branched chain structure.

It is preferred that the polyether diluent be perfluorinated. Examples of the useful aliphatic polyethers used in the present invention include poly(tetrafluoroethylene oxide), poly(hexafluoropropylene oxide), poly(fluorinated butylene oxide), copolymers formed from different fluorinated alkylene oxides, etc. The polyethers used in the present invention are a non-solvent for the polyarylate which is formed and further, will separate from the acetic acid by-product to form a separate layer therefrom. Thus, removal of the diluent can be achieved by decantation of the diluent layer which then can be recycled to the polymerization stage. The polyether diluents used in this invention are non-flammable and non-toxic.

The poly(fluorinated alkylene oxides) used in the present invention are of relatively low molecular weight. Thus, molecular weights ($M_n$) of about 600 to 20,000 are typical with molecular weights of about 600 to 5,000 being more typical and preferred.

The diluent used in the present invention should be present in amounts of from about 10 to about 60 wt. % based on the weight of the total charge. Preferred amounts of the diluent range from about 10 to about 40 wt. % and most preferably from about 10 to 30 wt. % based on total charge.

The amount of the diluent can vary during the polymerization reaction. For example, it may be advantageous to increase progressively the amount of the diluent to maintain the reaction medium at about constant viscosity.

The reaction of diester derivative of a dihydric phenol with the aromatic carboxylic acid is carried out, in addition to the presence of said diluent and a reaction catalyst, with suitable quantities of a trisphenol whose formula is:

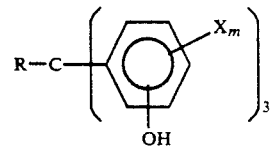

II wherein R is H or a branched or linear, $C_1$ to $C_{10}$ alkyl or alkenyl radical, m is 0 1, or 2; X is any non-interfering substituent, the same or different in each occurrence and the position of the —OH on the ring may be the same or different in each occurrence. Desirably, m is 0, R is an alkyl group of less than 5 carbons, and the —OH group is in the same position in at least two of the three rings. Preferably, R is —CH$_3$. The most preferred trisphenol is that in which R is —CH$_3$, m is 0, and each —OH is in the para position, i.e. 1,1,1-tris(4-hydroxyphenyl) ethane (THPE).

The trisphenols of formula II may be prepared by the methods described in U.S. Pat. No. 4,394,496 and U.S. Pat. No. 4,764,580, both of which are incorporated herein by reference.

The trisphenol is present in the reaction mass in sufficient quantities to significantly increase the shear sensitivity of the resultant polyarylate and also provide for a high molecular weight material. Preferably, the trisphenols are present in an amount of from about 0.01% to about 1.5% (mole percent) based on the moles of the dihydride phenol (formula III) used. It is critical that the mole percentage of trisphenol not be greater than about 1.5 because of the promulation of cross-linking and the resultant formation of gels. More preferably, the trisphenol is present in an amount of from about 0.1 to about 1.40% and most preferably from about 0.80 to about 1.30.

It is also critical in order to achieve the objects of the present invention to employ a reaction catalyst or a mixture of reaction catalysts. The overall objective is to use catalysts to accelerate the rate of polymerization of the reaction mixture. These catalysts are sometimes called esterification catalysts.

All the conventional catalysts being capable of accelerating an ester exchange reaction are usable. Suitable examples of catalysts are salts or compounds of elements selected from Groups 1A, 2A, 2B, 3A, 4A, and 5A of the periodic table of elements. Examples include metal oxides (e.g., magnesium oxide, lead oxide, zinc oxide, antimony trioxide); alkoxides which are prepared by the reaction of an alcohol or glycol and an alkali metal, alkaline earth metal, aluminum or titanium; sodium acetate and sodium benzoate; metal hydrides and metal borohydrodes (e.g., lithium hydride, potassium borohydride ($K_2B_2H_6$). One preferred catalyst is an alkali metal salt and most preferred are lithium and potassium salts including the acetates, carbonates, benzoates, formates, bicarbonates, hydroxides, phosphates, and monohydrogen phosphates of lithium or potassium. The lithium salts are especially preferred including lithium acetate, carbonate, and hydroxide. The catalyst is added in amounts between about 5 to 100 ppm based on polymer, preferably about 20 to 50 ppm, and most preferably about 25 ppm.

Additional catalysts may also be used, in combination with the above described catalysts. Examples include the imidazole catalysts disclosed in U.S. Pat. No. 4,612,360 incorporated herein by reference. Specific examples include 1-methylimidazole, 1-ethylimidazole, 2-ethyl-4-methylimidazole, and benzimidazole.

A cobalt salt may be added to the reaction medium along with the esterification catalyst, to act as cocatalyst and as well to yield a polyarylate of suitable color, in particular, improved Hunter b color in which the yellowness of the polyarylate is substantially reduced. Cobalt has a catalytic effect in the "diacetate process" and can reduce the yellow color in the "as-prepared" polyarylates formed by the present diacetate process. Any cobalt salt may be used as the cocatalyst to improve polyarylate color, including but not limited to, cobalt acetate, cobalt benzoate, cobalt carbonate, cobalt phenate, and the cobalt salt of aliphatic or isoaliphatic carboxylic acids which contain 3 to 20 carbon atoms, such as cobalt 2-ethylhexanoate. The cobalt salt can be added directly to the monomeric components or, more preferably, to insure solubility and uniform dispersion of the cobalt salt, the cobalt salt can be dissolved in the said diluent prior to addition. In general, the cobalt salt should be added in sufficient amounts to yield at least about 20 ppm, preferably at least 25 ppm of cobalt in the final polymer. Below these levels, some color improvement has been found although water white color is not achieved. More preferably, the amount of cobalt should range from about 30 ppm to 60 ppm based on the final polymer. Preferred polyarylate color has a value of less than 2.0 on the Hunter b scale.

The reaction of the diester derivative of the dihydric phenol with the aromatic dicarboxylic acid, in the presence of an inert diluent, a reaction catalyst and a trisphenol, is performed with the diester and acid reactants present in a diester/acid ratio of from about 0.85 to 1.10 and, preferably, from about 0.97 to 1.03.

The process of this invention is carried out at a polymerization temperature of from about 50° C. to about 350° C. and preferably, from about 75° to about 325° C. The present process is generally conducted in an inert atmosphere (such as argon or nitrogen). It is desirable to maintain the reaction temperature as low as possible to prevent the coloration of polymer while as high a reaction temperature as possible is preferred in terms of the rate of reaction. The process is initially carried out at atmospheric pressure or super atmospheric pressure and the pressure is reduced as polymerization proceeds. Near the end of polymerization, pressure as low as 0.1 mm Hg absolute may be used.

The polymerization reaction is conducted for a period of time sufficient to produce a polyarylate having a significantly increased shear sensitivity and which time is generally in the range of from about 4 hours to about 8 hours, depending on the particular polyarylate being prepared.

The process of this invention produces normally solid polyarylates having an intrinsic viscosity of from about 0.55 to greater than about 1.0, preferably from about 0.55 to 0.70 dl/gm, as measured in 1,1,2,2-tetrachloroethane at 30° C.

The polymerization reaction of this invention may be carried out batchwise or continuously by using appropriate staging and by using suitable apparatus. Moreover, the reactants may be added to the polymerization zone in any way or order desired.

The ester derivatives of the dihydric phenol and trisphenol may be formed in situ by adding the phenols together with the acid anhydride, an aromatic dicarboxylic acid, said diluent, the reaction catalyst and a trisphenol to the reactor and the reaction carried out in a single reaction zone under combined esterification and polymerization conditions as described above. Additionally, the ester derivative of the dihydric phenol and trisphenol may be first prepared and then an aromatic dicarboxylic acid, diluent, and reaction catalyst added directly to the same reaction vessel with the polymerization being carried out under the conditions described above.

The polyarylate polymer having the desired characteristics is recovered in its final form by methods well known to those in the art, such as by direct devolatilization in an extruder under conditions sufficient to remove the diphenyl ether compound, coagulation, spray drying, and the like.

The polyarylates may also be prepared by first forming a polyarylate prepolymer by reacting the ester derivatives of a dihydric phenol and trisphenol with an aromatic dicarboxylic acid under the conditions described previously, for a reaction time of about 3 hours. Under batch conditions, the polyarylate prepolymer is then heated at temperatures of from about 200° C. to 300° C. to obtain a polyarylate having the desired characteristics.

Alternatively, the polyarylate prepolymer may be added directly, after its formation, to a vented extruder or other suitable continuous reactor wherein the molecular weight is increased to form the polymer.

The polyarylates may be prepared in the presence of materials such as molecular weight regulators, antioxidants, and the like. The polyarylates obtained by the process of this invention may be used together with the well-known additives such as plasticizers, pigments, lubricating agents, old release agents, stabilizers, inorganic fillers, and the like. These polyarylates may also be blended with other polymers.

The following examples are for the purpose of illustrating the invention and should not be construed so as to unduly restrict the invention to the specific embodiments shown.

EXAMPLES 1-23
(MELT POLYMERIZATION)

Acetylation and prepolymerization procedure for each example was as follows: Table I lists the reactants, diluent, and catalysts for all acetylations and prepolymerizations.

TABLE I

| Reactants | Moles | Weight, Grams |
|---|---|---|
| Bisphenol-A | 0.795 | 181.49 |
| Tris(4-Hydroxyphenyl)Ethane Triacetate (THPETA) | 0.0099 | 4.26 |
| Isophthalic Acid | 0.6075 | 100.85 |
| Terephthalic Acid | 0.2025 | 33.62 |
| Dowtherm-A | 25 wt % | 166 |
| Acetic Anhydride (98.38%) | 1 wt % excess | 166.57 |
| Lithium Hydroxide | 25 ppm Li based on polymer | 0.045 |
| Cobalt Acetate | 40 ppm Co based on polymer | 1.7 ml of a 3.1 g Co(OAc)2/100 g AcOH solution |

The THPETA was prepared as follows

Tris-(4-hydroxyphenyl)ethane (THPE) was refluxed in an excess of acetic anhydride for 4 hours with lithium acetate as catalyst. The acetic acid and excess acetic anhydride were removed by distillation. The residue was allowed to cool to room temperature where upon it solidified. The solid was treated with aqueous sodium hydroxide to remove any phenolics. The slurry was filtered, washed with water, and dried. Yield=98%, purity=99+%. MP=169° C., NMR: $H^1$ (CDCL$_3$) 7.01 to 7.10(q), 2.24(s), 2.16(s); $C^{13}$ (CDCL$_3$) 169.65, 149.06, 146.19, 129.75, 120.98, 51.45, 30.61, 20.91.

All the reactants are charged into a 1-liter 3 neck flask fitted with a mechanical stiffer, Snyder column with distillation head, and a thermowell. The temperature of the reaction was controlled by a West temperature controller. The following was the temperature profile used in all the prepolymerizations.

TABLE II

| Stage | Temperature | Ramp Time | Dwell Time | Comments |
|---|---|---|---|---|
| 1 | 85° C. | 60 minutes | 10-18 hours | Acetylation |
| 2 | 240° C. | 5 minutes | 46 minutes | |
| 3 | 270° C. | 5 minutes | 133 minutes | |

Initially the bisphenol-A was acetylated before the prepolymerization was started. After acetylation the temperature was rapidly ramped to 240° C. during which acetic acid was distilling out. The prepolymer was isolated by pouring the molten mass into a container linked with Kapton film. The prepolymer was allowed to cool and solidify before postpolymerizing it to higher molecular weight. Postpolymerization procedure for each example was as follows:

The formed prepolymer was driven to high molecular weight by a postpolymerizing procedure. The prepolymer (50 g) was placed into a reactor that was stirred while under vacuum. Overhead was collected into a graduate cylinder. The prepolymer was first dried under full vacuum at 100° C. for 1 hour. The temperature was then ramped to 320° C. At 320° C. vacuum pulldown began. After 15 minutes, the vacuum was turned on full. The prepolymer was kept under vacuum (0.05 mmHg) for 25 minutes. As the molecular weight increased, the melt viscosity rapidly increased. Therefore, it was necessary to reduce the stirring speed to prevent the polymer from crawling up the stirrer shaft. The final polymer was isolated and intrinsic viscosity was measured. Table III shows the results of the polyarylate made with THPE.

TABLE III

| | MELT POLYMERIZATION | |
|---|---|---|
| EXAMPLE NO. | MOLE % THPE | INTRINSIC VISCOSITY |
| 1 | 0.0 | 0.64 |
| 2 | 0.0 | 0.809 |
| 3 | 0.0 | 0.543 |
| 4 | 0.0 | 0.617 |
| 5 | 0.0 | 0.778 |
| 6 | 0.0 | 0.663 |
| 7 | 0.0 | 0.739 |
| Average | | 0.6841 |
| 8 | 0.41 | 0.61 |
| 9 | 0.41 | 0.55 |
| Average | | 0.58 |
| 10 | 0.82 | 0.76 |
| 11 | 0.82 | 0.84 |
| 12 | 0.82 | 0.78 |
| Average | | 0.79 |
| 13 | 0.86 | 0.99 |
| 14 | 0.86 | 0.88 |
| Average | | 0.93 |
| 15 | 1.23 | 0.90 |
| 16 | 1.23 | 0.85 |
| 17 | 1.23 | 0.80 |
| 18 | 1.23 | 0.84 |
| 19 | 1.23 | 0.85 |
| 20 | 1.23 | 0.95 |
| 21 | 1.23 | 0.91 |
| Average | | 0.87 |
| 22 | 1.62 | Cross-Linked & Gelled |
| 23 | 1.62 | Cross-Linked & Gelled |

EXAMPLES 24-30

Polyarylate with THPE incorporated into the backbone was also done in a solution polymerization method on a laboratory 2-liter scale and a 5 gallon scale.

A 2-liter 3-neck flask fitted with a mechanical suffer, 5-tray sieve plate column with reflux condenser and thermowell was charged with a typical recipe found in Table IV. The reactor is heated with a sand bath set at 320° C. The reactor temperature was controlled by a West programmable temperature controller. Acetylations were done at 110° C. and held at this temperature overnight. The polycondensation phase of the reaction was started at the end of acetylation. A typical time-temperature profile for the polycondensation is shown:

| Temperature | Ramp Time | Dwell Time |
|---|---|---|
| 265° C. | 15 minutes | 420 minutes |

Acetic acid was distilled from the mixture. At the end of the reaction, the heating was stopped and the hot solution was emptied into a vessel containing hot agitated toluene. The toluene solution was allowed to cool to room temperature whereupon the polymer precipitated out as a powder. The white polymer was filtered and dried in a vacuum oven set at 150° C. (see Example No. 29, Table V).

TABLE IV

| Reactants | Weights (Grams) |
| --- | --- |
| Bisphenol-A | 181.57 |
| Isophthalic Acid | 99.11 |
| Terephthalic Acid | 33.11 |
| Acetic Anhydride | 165.60 |
| Downtherm-A | 427.64 |
| Lithium Hydroxide Monohydrate | 0.044 (25 ppm) |
| Cobalt Acetate | 1.65 mL (40 ppm) |
| THPETA | 4.26 |

The entire polymerization was also done in one day by ramping the reaction mixture from room temperature to 140° C. and held there for 1 hour. At the end of this time the polycondensation was initiated (see Example No. 30, Table V).

Examples 24–28 were conducted on a 5 gallon level using the same procedure as set forth above. These results are also set forth in Table V (see Example Nos. 24–28).

The laboratory intrinsic viscosities (IV's) were 0.99 and 0.83 (Example Nos. 29 and 30, respectively) compared with an average of 0.62 without THPE. The results from the 5 gallon reactor runs show that the IV increases with increasing THPE level. This was also observed in the melt polymerization method described above. Again the polymers made with THPE in the 5 gallon reactor gave significantly higher IV than without it (IV=0.72 compared to IV=0.57, see Table V).

TABLE V

| | SOLUTION POLYMERIZATION | |
| --- | --- | --- |
| EXAMPLE NO. | MOLE PERCENT | INTRINSIC VISCOSITY |
| 24 | 0.0 | 0.57 |
| 25 | 0.5 | 0.60 |
| 26 | 0.75 | 0.59 |
| 27 | 0.85 | 0.64 |
| 28 | 1.0 | 0.72 |
| 29 | 1.23 | 0.993 |
| 30 | 1.23 | 0.833 |

Figure 3:
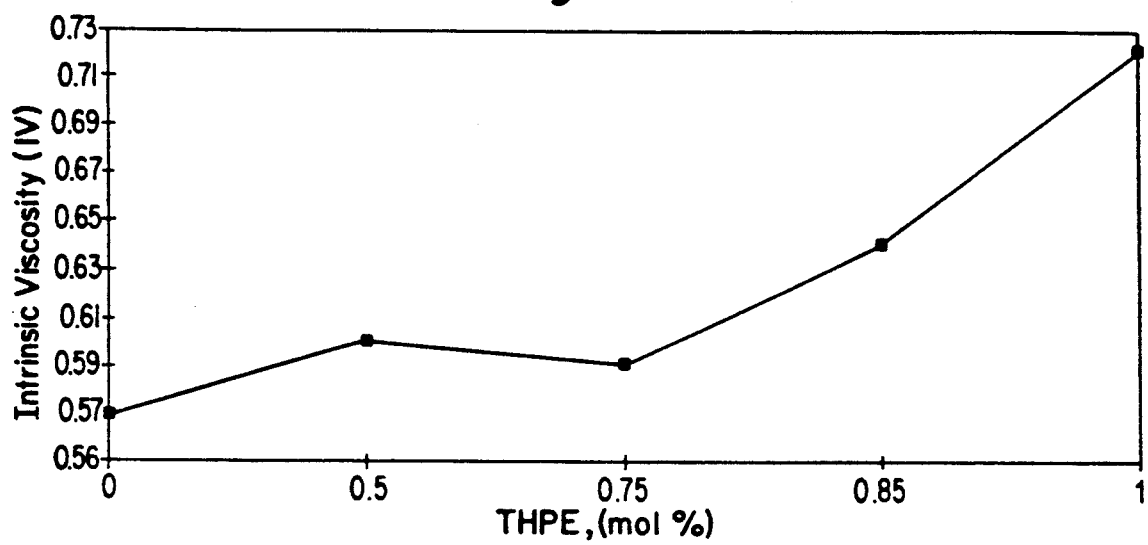

The data generated from Example Nos. 1–30, including melt polymerization and solution polymerization (Example Nos. 24–30), are set forth in Tables III and V and also graphically illustrated in FIGS. 1 and 3. Example Nos. 1–7 illustrate the non-use of THPE. Example Nos. 8–21 illustrate the use of THPE in a melt polymerization process. Example Nos. 24–30 illustrate the use of THPE in a solution polymerization process. Example Nos. 22 and 23 illustrate the use of THPE at levels outside the present invention, and wherein cross-linking (gelling) of the resultant polymer occurs and which is highly undesirable. Example Nos. 24–28 illustrate a scale-up in volume as compared to Example Nos. 29 and 30.

Table III sets forth the raw data showing the effect of THPE level on intrinsic viscosity in the melt polymerization. The data from Table III is graphically illustrated in FIG. 1.

Table V sets forth the raw data showing the effect of THPE level in intrinsic viscosity in the solution polymerization. The data from Table V is graphically illustrated in FIG. 3.

Figure 2:
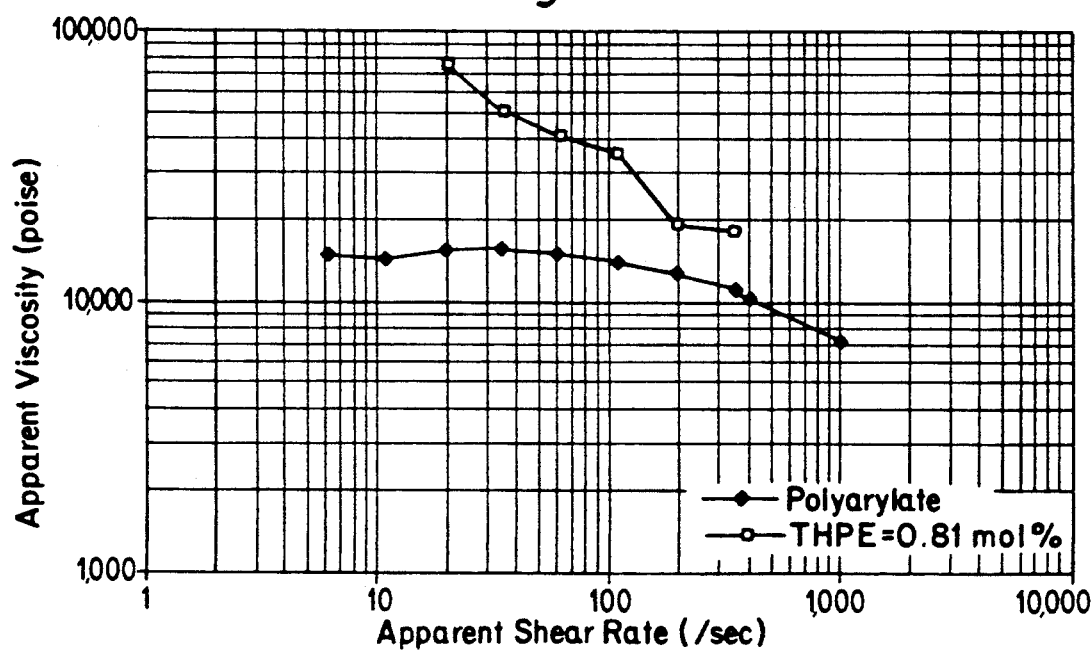
FIGS. 2 and 4 show the effect of a trisphenol on shear viscosity in a melt polymerization and solution polymerization processes, respectively, and are representative of the data obtained from the experiments described herein.
Figure 4:
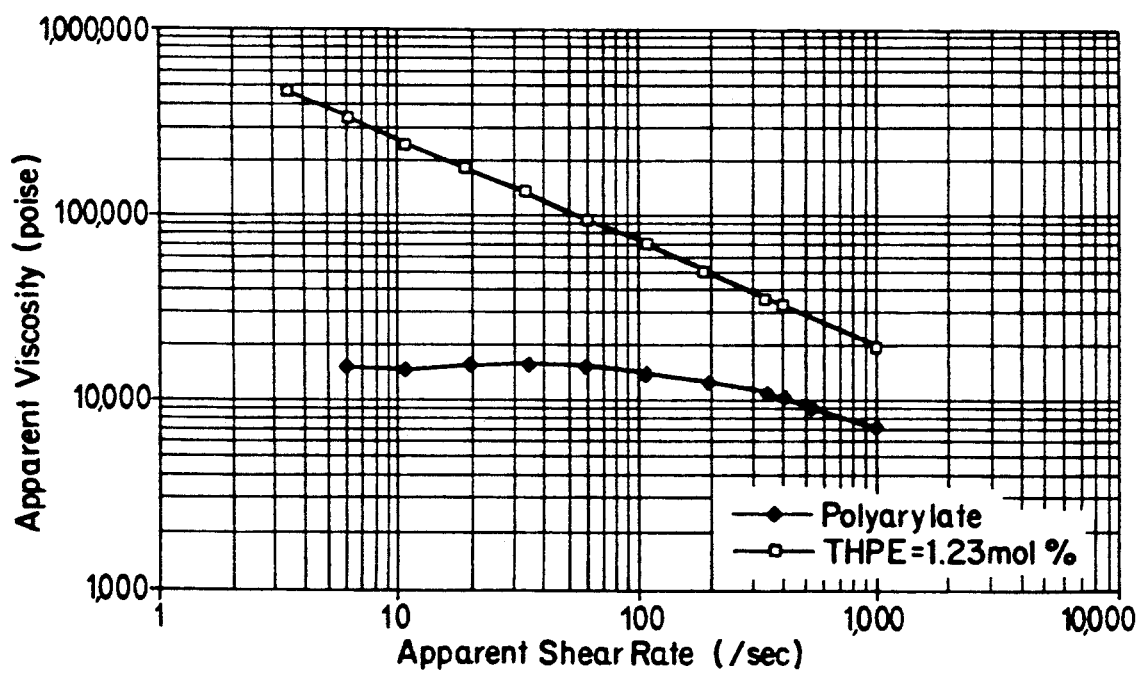

The rheological properties (Apparent Shear Rate versus Apparent Viscosity) are represented in FIGS. 2 and 4, respectively for melt polymerization and solution polymerization. A Rheometric rheometer was utilized in the above procedures for measurement of the polyarylate-THPE polymers. Linear polyarylate polymer properties were plotted as the comparison. A significant shear sensitivity difference is clearly shown in FIGS. 2 and 4.

FIGS. 1 and 3 show the effect of THPE on intrinsic viscosity. A definite trend is seen on incorporating THPE in small quantities into the reaction mixture. The trend seen in FIGS. 1 and 3 demonstrate a significant increase in intrinsic viscosity with increasing THPE content. It is noted that at the 1.62 mole % level of THPE, the polymer cross-linked and gelled.

It was found that the incorporation of THPE into the process allowed the use of lower reaction temperatures and reaction time, thus increased polymer throughput. It was also noted that there was a desirable increase in polymer flow characteristics as indicated by FIGS. 2 and 4.

While the invention is described with respect to specific embodiments, modifications thereof can be made by one skilled in the art without departing from the spirit of the invention. The details of said embodiments are not to be construed a limitation except to the extent indicated in the following claims.

What is claimed is:

1. A process for the production of polyarylates which comprises the steps of reacting together under esterification conditions the following:
   (a) an ester of a dihydric phenol;
   (b) at least one aromatic dicarboxylic acid selected from the group consisting of isophthalic acid, terephthalic acid, and mixtures thereof;
   (c) a reaction catalyst which is present in the reaction mixture at a level of from about 5 ppm to about 100 ppm;
   (d) an inert diluent, having a boiling point of about 200° C. to about 350° C., selected from the group consisting of a poly(fluorinated alkylene oxide) and a diphenyl ether compound and which is present in amounts of from about 10% to about 60% by weight, based on the total weight of the reaction mixture;
   (e) a tripshenol compound which is present in the reaction mixture at about 0.1 to about 1.5 mole percent, based on the moles of said dihydric phenol;

wherein the reaction is carried out at a temperature of from about 50° C. to about 350° C., at a pressure of from about atmospheric to subatmospheric and for a sufficient period of time to produce the polyarylate having a significantly increased shear sensitivity.

2. The process of claim 1 wherein said poly (fluorinated alkylene oxide) has the repeating unit:

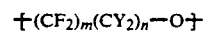     I wherein m is an integer from 1 to 10, n is an integer from 0 to 5, and Y is the same or different and represents hydrogen or halogen.

3. The process of claim 2 wherein the trisphenol is a compound having the formula:

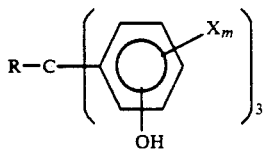

wherein R is H or a branched or linear, $C_1$ to $C_{10}$ alkyl or alkenyl radical, m is 0, 1 or 2; X is any non-interfering substituent, the same or different in each occurrence and the position of the —OH on the ring may be the same or different in each occurrence.

4. The process of claim 3 wherein the trisphenol is 1,1,1-tris(4-hydroxyphenyl) ethane.

5. The process of claim 1 wherein said diluent is an eutectic mixture of diphenyl oxide and biphenyl.

6. The process of claim 1 wherein said diluent is poly (perfluorinated propylene oxide).

7. The process of claim 1 wherein said dihydric phenol is bisphenol-A.

8. The process of claim 1 wherein said aromatic dicarboxylic acid is a mixture of isophthalic acid and terephthalic acid.

9. The process of claim 8 wherein the mole ratio of isophthalic acid to terephthalic acid is about 3:1.

10. The process of claims 7 and 9 wherein the trisphenol is 1,1,1-tris(4-hydroxyphenyl)ethane and is present in the reaction mixture at about 0.1 to about 1.5 mole percent based on the moles of said dihydric phenol.

11. The process of claim 1 wherein said catalyst is an alkali metal catalyst.

12. The process of claim 11 wherein cobalt is additionally added to said reaction mixture in an amount of at least 20 ppm relative to the polymer which is formed and said alkali metal is lithium.

13. The process of claim 12 wherein said cobalt is present at levels of between about 30 and 60 ppm.

14. The process of claim 1 wherein said diester of a dihydric phenol is the diacetate.

15. The process of claim 14 wherein said diacetate of the dihydric phenol is produced in-situ during said reacting by reaction of acetic anhydride and said dihydric phenol.

16. The process of claim 15 wherein said dihydric phenol is bisphenol-A.

17. The process of claim 16 wherein the trisphenol is 1,1,1-tris(4-hydroxyphenyl)ethane.

* * * * *